Dec. 5, 1950     C. B. LEAVENGOOD     2,533,123
POSTHOLE DIGGER

Filed May 2, 1947     2 Sheets-Sheet 1

Inventor
Charles B. Leavengood.
By
Fishburn & Mullendore.
Attorneys

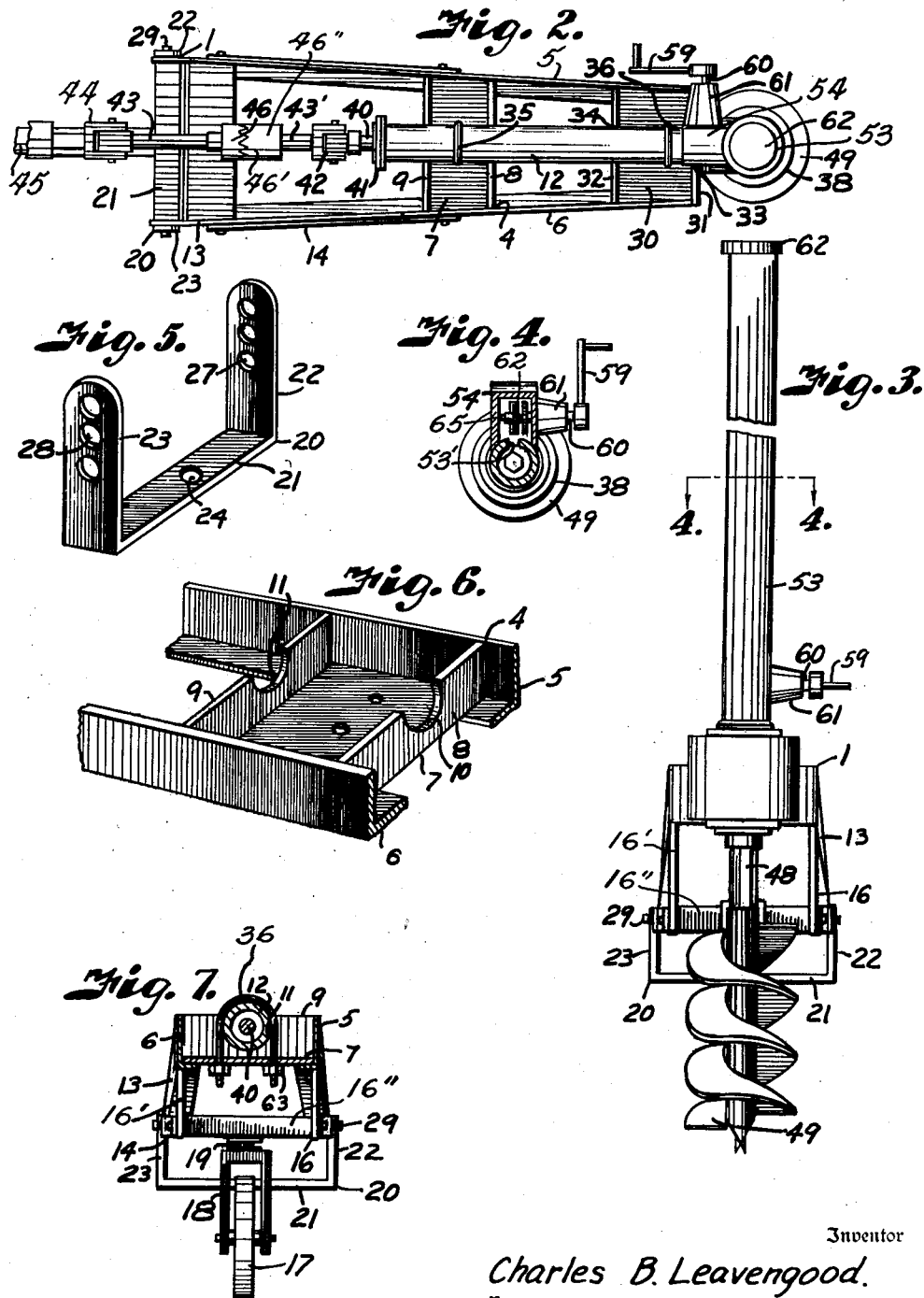

Patented Dec. 5, 1950

2,533,123

UNITED STATES PATENT OFFICE 2,533,123

POSTHOLE DIGGER

Charles B. Leavengood, Enid, Okla.

Application May 2, 1947, Serial No. 745,506

3 Claims. (Cl. 255—19)

This invention relates to a post hole digger of auger type, and is particularly adapted to be attached to the rear of a tractor and operable from the power take-off of the tractor.

The principal objects of the present invention are to provide a device of this character having the auger mounted so that it may be rotated relative to its mounting at any angle about the axis of such mounting, thereby permitting digging of a hole on inclines lateral to the tractor and mounting frame for the auger; to provide universal connection of the drive shaft for the auger to the power take-off of the tractor; to provide a frame for mounting the auger adapted to swing in any position; to provide adjustable means for mounting the frame on the tractor frame to permit leveling of the auger frame with respect to the tractor; and to provide a device of this character simple, economical to manufacture and efficient in operation.

In accomplishing these and other objects of the present invention, I have provided improved details of structure, the preferred form of which is illustrated in the accompanying drawings, wherein:

Fig. 2 is a plan view of parts of the device as shown in Fig. 1.

Fig. 3 is an elevational view taken from the outer end of the device.

Fig. 4 is a transverse cross-section taken on a line 4—4, Fig. 3.

Fig. 5 is a perspective view of the bolster or yoke attaching the frame to the tractor.

Fig. 6 is a partial perspective view of the mounting for the auger.

Fig. 7 is a transverse sectional view taken on a line 7—7, Fig. 1.

Figure 1:
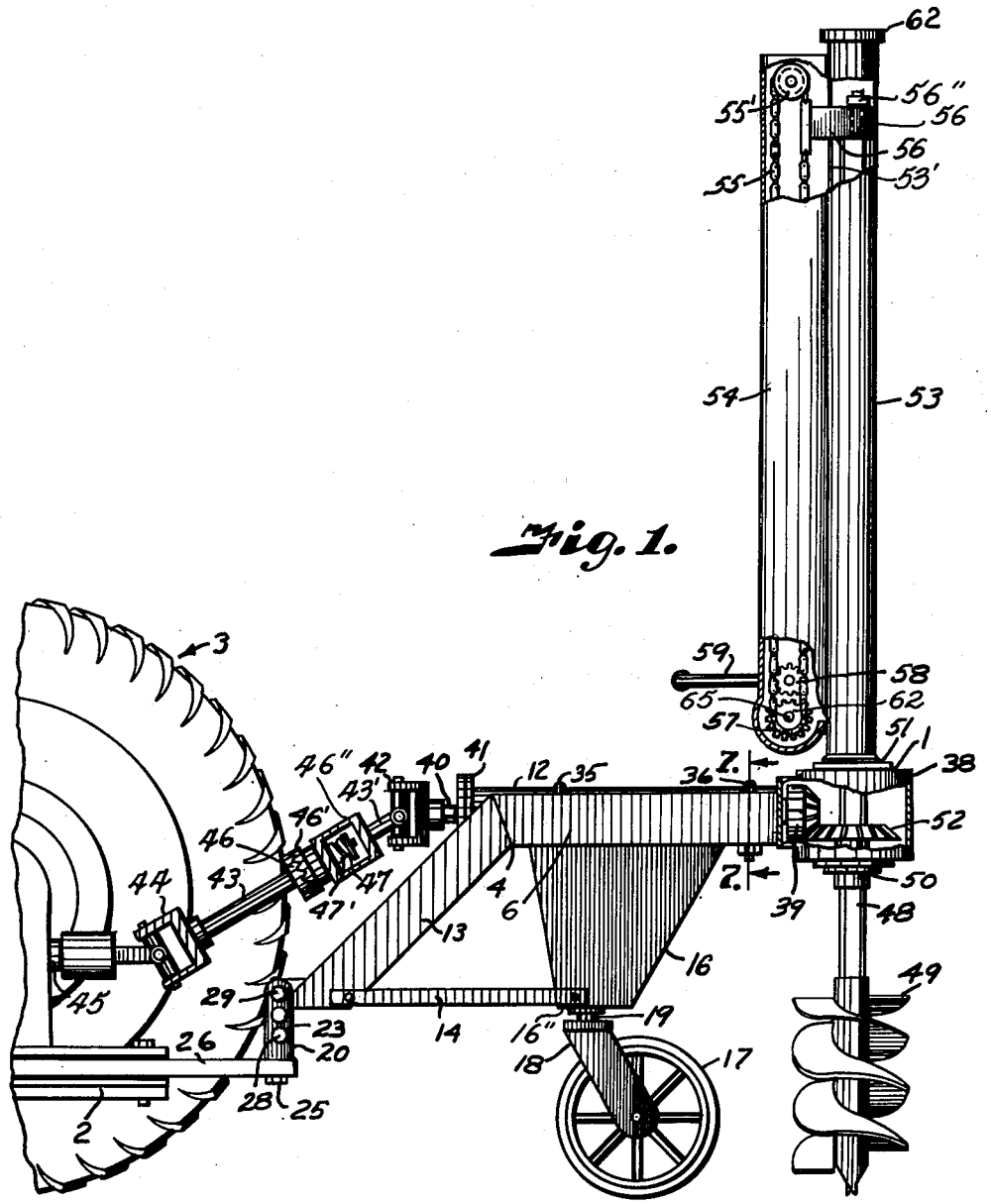
Fig. 1 is an elevational view partly in cross-section with parts broken away to better illustrate the invention.

Referring more in detail to the drawings:

1 designates a post hole digger embodying the features of my invention adapted to be attached to the rear framework 2 of a tractor 3 as best illustrated in Fig. 1.

The device includes a framework 4 comprising parallel, horizontally extending angle members 5 and 6 provided with a cross member 7 substantially centrally thereof having side members 8 and 9 provided with recesses 10 and 11 providing bearing surfaces for a tubular member 12. Extending obliquely downward from one end of the angle members are angle-shaped braces 13 having their lower ends rigidly secured to horizontally extending braces 14. Rigidly secured to and depending from the horizontal angle-shaped members 5 and 6 and having their lower ends rigidly secured to the horizontal braces 14 are web members 16 and 16' connected by a cross arm 16" which form a support for a caster wheel 17 provided with the usual framework 18 having an upstanding pin 19 engaging in an opening in the cross arm for pivotally mounting the caster to said cross arm of the support.

A hitch 20 is provided for connecting the framework 4 to the frame of the tractor. The hitch comprises a substantially U-shaped member or yoke having a transverse bar 21 and arms 22 and 23. The bar 21 is provided with an opening 24 adapted to receive a bolt or the like 25 for connecting the hitch to a rearwardly extending arm 23 attached to the frame 2 of the tractor. The upstanding arms 22 and 23 of the hitch are provided with a plurality of openings 27 and 28 for receiving a bolt or the like 29 secured to the forward end of the framework 4 for attachment of the forward end of the framework 4 to the tractor. The plurality of openings in the hitch will provide for adjustment of the framework to different heights of the connecting bar to the tractor so that the framework may be substantially horizontal to the tractor structure.

The rear ends of the angle-shaped members 5 and 6 are also connected by a cross member 30 having sides 31 and 32 provided with recesses 33 and 34 forming a bearing for receiving the tubular member 12. The tubular member 12 is held in place by U-bolts 35 and 36 for securing said member in the bearing surfaces provided by the recesses 10 and 11 and 33 and 34 in the cross members 7 and 30.

Secured to the rear end of the tubular member 12 is a head 38 comprising a housing for a pinion gear 39 secured to a shaft 40 extending through the tubular member 12. The forward end of the tube is provided with a flange member 41 providing a bearing for the shaft extending therethrough. Secured to the forward end of the shaft 40 is a universal joint 42 for a connecting rod 43 having its opposite end connected by a universal joint 44 to a power take-off shaft 45 of the tractor as best illustrated in Fig. 1. The connecting rod is in two parts as indicated at 43 and 43' and provided with clutch members 46 and 46'. The part 46' of the clutch is centrally bored and includes a cage 46" through which the end 46" of the rod 43 extends. The end of the rod is held in place by suitable means such as a washer or the like against which one end of a coil spring 47' engages to provide spring-tensioned adjusting means to compensate for the difference in angularity of the framework structure 4 to the tractor.

The head 38 on the end of the tube 12 is in alignment with the caster wheel 17, and is adapted for mounting a shaft 48 having an auger 49 on its lower end. The shaft is mounted on the head by suitable collars forming bearings 50 and 51 for the shaft. Mounted on the shaft 48 within the head 38 is a beveled gear 52 adapted to mesh with the pinion gear 39 for rotating the auger as will later be described.

Rigidly secured to the upper side of the head 38 and extending vertically thereabove is a tubular member 53 in which the shaft 48 is adapted to be moved upwardly and downwardly, the tubular member 53 acting as a guide for the shaft 48. One side of the tubular member 53 is slotted as indicated at 53'. Secured to one side of the tubular guide member 53 over the slot 53' is a housing 54 for an endless chain 55 running over a sprocket wheel 55' carried by the top of the housing 54. The chain 55 is provided with a lug or arm 56 which extends into the tubular member 53 and is provided with an opening for receiving the upper threaded end of the shaft 48, the threaded portion being offset forming a shoulder 56' and the shaft being secured to the arm 56 by nut 56'', the arm being slideably mounted within the slot of the tubular guide member 53. The shaft 48 is mounted in the opening in the arm 56 so it may rotate therein. A gear reduction mechanism is provided in the lower end of the housing 54 comprising spur gears 57 and 58 operable by a crank 59 attached to a shaft 60 carried by a housing 61 extending laterally from the housing 54 for raising and lowering the auger on the lower end of the shaft 48. The chain 55 runs over a sprocket 62 mounted on the shaft 65 in the lower end of the housing 54. The top of the tubular guide member 53 is provided with a cover 62.

The U-bolts 35 and 36 hold the tubular member 12 in rigid position on the frame 4, and the head 38 holds the auger in rigid position. The angle of the auger to the framework structure and tractor may be changed by loosening the nuts 63 of the U-bolts and turning of the tubular member with its head to either the right or left to the desired position and then tightening of the U-bolt to hold the tubular member in that position. The auger may be turned to approximately a 45° angle with respect to the framework and tractor structure to thus provide for drilling a straight hole in the earth when the tractor is sitting on uneven ground, for instance, the side of a hill, the ground being uneven laterally to the tractor. The frame being pivotally attached to the tractor compensates for unevenness of the ground fore and aft of the caster wheel.

Operation of a device constructed and assembled as described is as follows:

When the framework structure 4 has been attached to the tractor frame by the tractor hitch 20 and the adjustment made so that the framework will be substantially horizontal to the tractor, the universal joint 44 of the connecting rod 43 is attached to the power take-off 45 of the tractor and the device transported to the desired place where the holes are to be dug. The auger will thus be trailed directly behind the tractor and when the auger is placed in the desired location to drill the hole, the auger may be lowered through operation of the crank 59 to lower the same to the ground. Operation of the motor will drive the shaft 40 through the universal connection with the power take-off to rotate the auger through shaft 48 by driving of the beveled gear 52 through pinion gear 39. As the auger is rotated, downward pressure may be exerted thereon through turning of the crank 59 to continuously lower the shaft through the guide tube 53 and thus lowering the auger. When the desired depth of the hole is reached, the auger is raised by turning of the crank to lift the auger through the endless chain 55 and its connection with the upper end of the shaft 48. Should the ground in which the holes are desired to be bored be uneven laterally of the tractor, the auger may be placed in the vertical position by loosening of the U-bolt and rotating the tubular member 12 as above described to place the shaft 48 at the desired angle to the framework 4.

While I have here illustrated the shaft 48 to be of hexagon shape, it will be obvious that any form may be used. Other changes may be made in the device as illustrated without departing from the spirit of my invention.

What I claim and desire to secure by Letters Patent is:

1. An earth boring apparatus adapted to be attached to the framework of a tractor and operable from the power take-off of said tractor comprising, a frame having cross members provided with bearing surfaces located substantially centrally thereof, a caster wheel supporting the frame, a bolster for pivotally attaching the frame to the tractor frame, a tubular member horizontally supported on the frame in said bearing surfaces, U-bolts for rotatably mounting the tubular member in said bearing surfaces, a head secured to said tubular member, a drive shaft extending through the tubular member, a shaft mounted on said head and extending above and below the head, an auger on the lower end of the shaft, means connecting the drive shaft to the power take-off of the tractor for rotating said drive shaft, and means in said head carried by said shaft and said drive shaft for rotating said auger.

2. An earth boring apparatus adapted to be attached to the framework of a tractor and operable from the power take-off of said tractor comprising, a frame having cross members provided with bearing surfaces located substantially centrally thereof, a caster wheel supporting the frame, means for attaching the frame to the tractor frame, a tubular member horizontally supported on the frame in said bearing surfaces, means for rotatably securing the tubular member in said bearing surfaces, a head secured to said tubular member, a drive shaft extending through the tubular member, a shaft mounted on said head, an auger on the lower end of the shaft, means connecting the drive shaft to the power take-off of the tractor for rotating the drive shaft, means in said head carried by said shaft and said drive shaft for rotating said auger, and means for raising and lowering the auger.

3. An earth boring apparatus to be attached to a tractor comprising, a frame supporting structure including a caster wheel for said structure, means for attaching said frame supporting structure to said tractor, said means including a U-shaped frame having openings adapted to receive bolts for adjusting the height of connection of the frame supporting structure to the tractor and pivotally connecting the frame thereto a tubular member extending horizontally of said frame supporting structure, a drive shaft extending through the tubular member, an auger, means for supporting said auger by the horizontal tubular member for up and down movement, means for rotatably mounting the tubular member on the frame supporting structure, and means connected to said tractor for rotating said auger.

CHARLES B. LEAVENGOOD.

REFERENCES CITED

The following references are of record in the file of this patent:

UNITED STATES PATENTS

| Number | Name | Date |
|---|---|---|
| 1,464,231 | Yazek | Aug. 7, 1923 |
| 2,217,300 | Templeton | Oct. 8, 1940 |
| 2,239,024 | Vance | Apr. 22, 1941 |
| 2,321,680 | Houston | June 15, 1943 |
| 2,384,557 | Piper | Sept. 11, 1945 |
| 2,411,627 | Jaques | Nov. 26, 1946 |